(12) United States Patent
Al Mahmood et al.

(10) Patent No.: US 12,182,099 B2
(45) Date of Patent: *Dec. 31, 2024

(54) ERROR TABLES TO TRACK ERRORS ASSOCIATED WITH A BASE TABLE

(71) Applicant: Snowflake Inc., Bozeman, MT (US)

(72) Inventors: Abdullah Al Mahmood, Bothell, WA (US); Tyler Jones, Redwood City, CA (US); Xin Huang, Bellevue, WA (US); Ganeshan Ramachandran Iyer, Redmond, WA (US); Jiaxing Liang, Bellevue, WA (US); Daniel Mills, Seattle, WA (US); Subramanian Muralidhar, Mercer Island, WA (US); Daniel E. Sotolongo, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,772

(22) Filed: Jan. 30, 2024

(65) Prior Publication Data
US 2024/0386010 A1 Nov. 21, 2024

Related U.S. Application Data

(63) Continuation of application No. 18/319,886, filed on May 18, 2023, now Pat. No. 11,921,700.

(51) Int. Cl.
| | | |
|---|---|---|
| *G06F 16/23* | (2019.01) | |
| *G06F 11/14* | (2006.01) | |
| *G06F 16/22* | (2019.01) | |

(52) U.S. Cl.
CPC ...... *G06F 16/2365* (2019.01); *G06F 11/1469* (2013.01); *G06F 16/2282* (2019.01); *G06F 2201/80* (2013.01)

(58) Field of Classification Search
None
See application file for complete search history.

(56) References Cited

U.S. PATENT DOCUMENTS

| | | |
|---|---|---|
| 5,790,779 A | 8/1998 | Ben-Natan et al. |
| 11,921,700 B1 | 3/2024 | Al Mahmood et al. |
| 2006/0222160 A1 | 10/2006 | Bank et al. |
| 2008/0071825 A1 | 3/2008 | Guo |
| 2008/0307262 A1 | 12/2008 | Carlin, III |
| 2010/0161555 A1 | 6/2010 | Nica et al. |
| 2010/0166008 A1 | 7/2010 | Hashimoto et al. |
| 2010/0211539 A1 | 8/2010 | Ho |
| 2014/0081907 A1 | 3/2014 | Tran et al. |
| 2015/0142775 A1 | 5/2015 | Kang et al. |

(Continued)

OTHER PUBLICATIONS

"U.S. Appl. No. 18/319,886, Non Final Office Action mailed Aug. 1, 2023", 16 pgs.

(Continued)

*Primary Examiner* — Eddy Cheung
(74) *Attorney, Agent, or Firm* — Schwegman Lundberg & Woessner, P.A.

(57) ABSTRACT

Techniques for creating and using error tables to track errors associated with a base table are described. A command to perform an operation on a base table stored in a network-based data system can be received and executed, causing at least one error. At least one error record corresponding to the at least one error can be inputted into an error table, which is nested with the base table. Contextual information can be added to the at least one error record.

24 Claims, 7 Drawing Sheets

(56) References Cited

U.S. PATENT DOCUMENTS

| | | |
|---|---|---|
| 2018/0096044 A1 | 4/2018 | Koza |
| 2020/0110792 A1 | 4/2020 | Tsabba |
| 2020/0334268 A1 | 10/2020 | Vasireddy et al. |
| 2021/0294291 A1 | 9/2021 | Murakami et al. |
| 2021/0319030 A1 | 10/2021 | Guiney |

OTHER PUBLICATIONS

"U.S. Appl. No. 18/319,886, Notice of Allowance mailed Nov. 17, 2023", 9 pgs.

"U.S. Appl. No. 18/319,886, Response filed Nov. 1, 2023 to Non Final Office Action mailed Aug. 1, 2023", 10 pgs.

"U.S. Appl. No. 18/451,522, Non Final Office Action mailed Jun. 21, 2024", 12 pgs.

"International Application Serial No. PCT/US2024/029570, International Search Report mailed Jun. 12, 2024", 3 pgs.

"International Application Serial No. PCT/US2024/029570, Written Opinion mailed Jun. 12, 2024", 7 pgs.

AWS, "STL Load Errors", [Online]. Retrieved from the Internet: <https://docs.aws.amazon.com/redshift/latest/dg/r_STL_Load_Errors.html>, (Accessed online Nov. 2, 2023), 6 pages.

AWS, "STL Loaderror Detail", [Online]. Retrieved from the Internet: <https://docs.aws.amazon.com/redshift/latest/dg/r_STL_LoadError_Detail.html>, (Accessed online Nov. 2, 2023), 4 pages.

Confluent, "Kafka Connect Deep Dive—Error Handling and Dead Letter Queues", Online Retrieved from the Internet https://www.confluent.io/blog/kafka-connect-deep-dive-error-handling-dead-letter-queues, (Accessed online Nov. 2, 2023), 29 pages.

Databricks, "Databricks data engineering What is Delta Live Tables", [Online]. Retrieved from the Internet: <https://docs.databricks.com/data-engineering/delta-live-tables/index.html>, (Accessed online Nov. 2, 2023), 7 pages.

Databricks, "Handle bad records and files", [Online]. Retrieved from the Internet: <https://docs.databricks.com/spark/latest/spark-sql/handling-bad-records.html>, (Accessed online Nov. 2, 2023), 3 pages.

Databricks, "Monitor Delta Live Tables pipelines", [Online]. Retrieved from the Internet: <https://docs.databricks.com/data-engineering/delta-live-tables/delta-live-tables-event-log.html#event-log-schema>, (Accessed online Nov. 2, 2023), 14 pages.

Databricks, "What is Delta Live Tables Manage data quality with Delta Live Tables", [Online]. Retrieved from the Internet: <https://docs.databricks.com/en/delta-live-tables/expectations.html>, (Accessed online Nov. 2, 2023), 12 pages.

Google Cloud, "Big Query Jobs View", [Online]. Retrieved from the Internet: <https://cloud.google.com/bigquery/docs/information-schema-jobs>, (Accessed online Nov. 2, 2023), 17 pages.

Google Cloud, "Introduction to the BigQuery Storage Write API", [Online]. Retrieved from the Internet: <https://cloud.google.com/bigquery/docs/write-api>, (Accessed online Nov. 2, 2023), 15 pages.

Google Cloud, "Package google cloud bigquery storage v1", [Online]. Retrieved from the Internet: <https://cloud.google.com/bigquery/docs/reference/storage/rpc/google.cloud.bigquery.storage.v1#google.cloud.bigquery.storage.v1.AppendRowsResponse>, (Accessed online Nov. 2, 2023), 42 pages.

Microsoft Ignite, "Copy Into Transact SQL", [Online]. Retrieved from the Internet: <https://docs.microsoft.com/en-US/sql/t-sql/statements/copy-into-transact-sql?view=azure-sqldw-latest&preserve-view=true>, (Accessed online Nov. 2, 2023), 28 pages.

Single Store, "View and Handle Pipeline Errors", [Online]. Retrieved from the Internet: <https://docs.singlestore.com/cloud/reference/troubleshooting-reference/pipeline-errors/view-and-handle-pipeline-errors/>, (Accessed online Nov. 2, 2023), 7 pages.

ERROR TABLES TO TRACK ERRORS ASSOCIATED WITH A BASE TABLE

PRIORITY CLAIM

This application is a Continuation of U.S. patent application Ser. No. 18/319,886, filed May 18, 2023, the contents of which are hereby incorporated by reference in their entirety.

TECHNICAL FIELD

The present disclosure generally relates to data systems, more specifically, to error tables associated with base tables.

BACKGROUND

Data systems, such as database systems, may be provided through a cloud platform, which allows organizations and users to store, manage, and retrieve data from the cloud. A variety of techniques can be employed for uploading and storing data in a database or table in a cloud platform. Errors, such as input rows failing to load due to parsing or transform errors, may occur, but these errors can be difficult to track.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for creating and using error tables to track errors associated with a base table are described. The error table can be populated with error records corresponding to errors encountered when performing various operations on the base table. The error records can also include contextual information about the errors. The error table can be a nested object of the base table, providing a single location for error records associated with a respective base table allowing users to more efficiently identify sources of errors and perform appropriate recovery actions.

Figure 1:
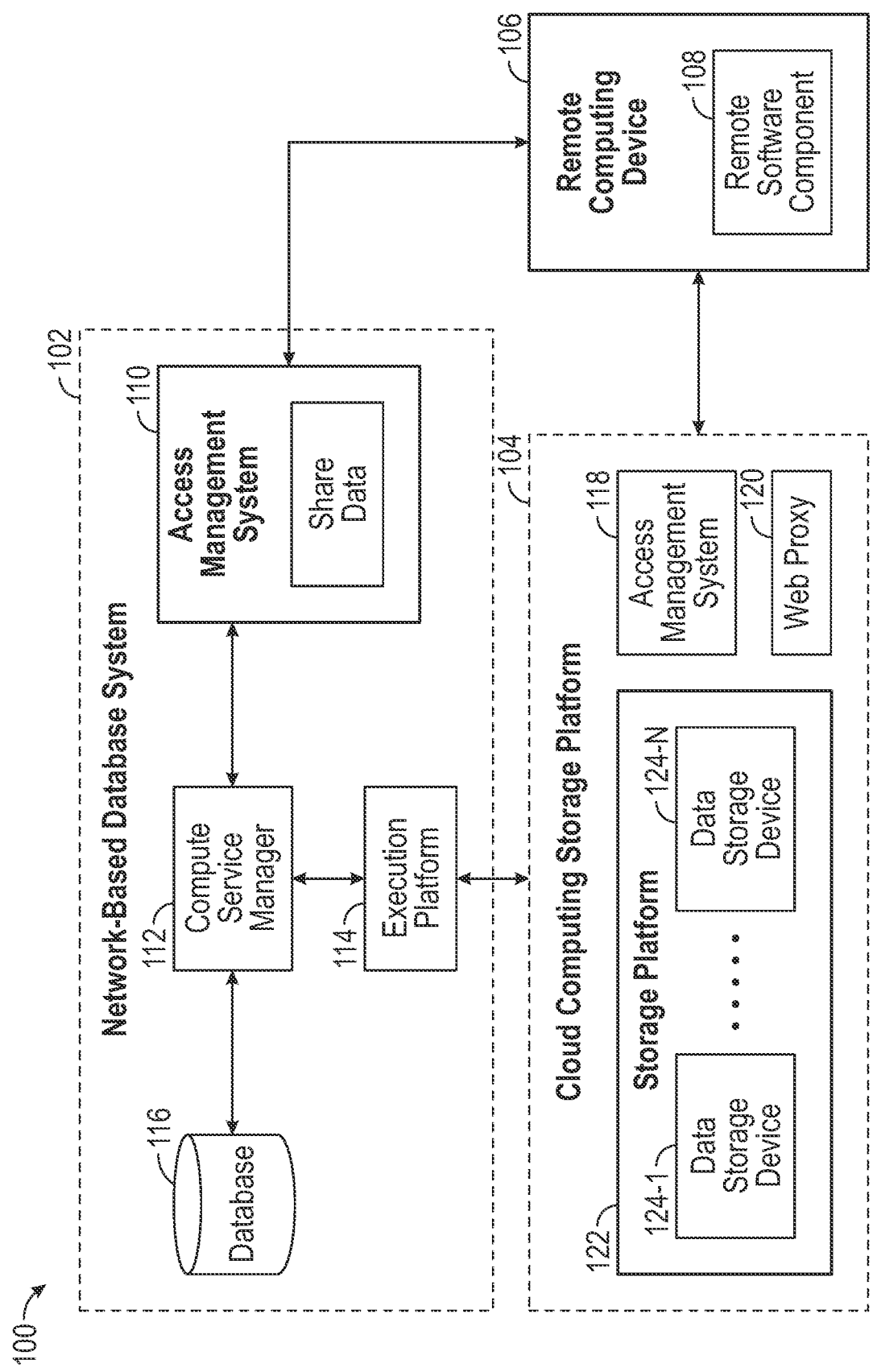
FIG. 1 illustrates an example computing environment with a cloud database system, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
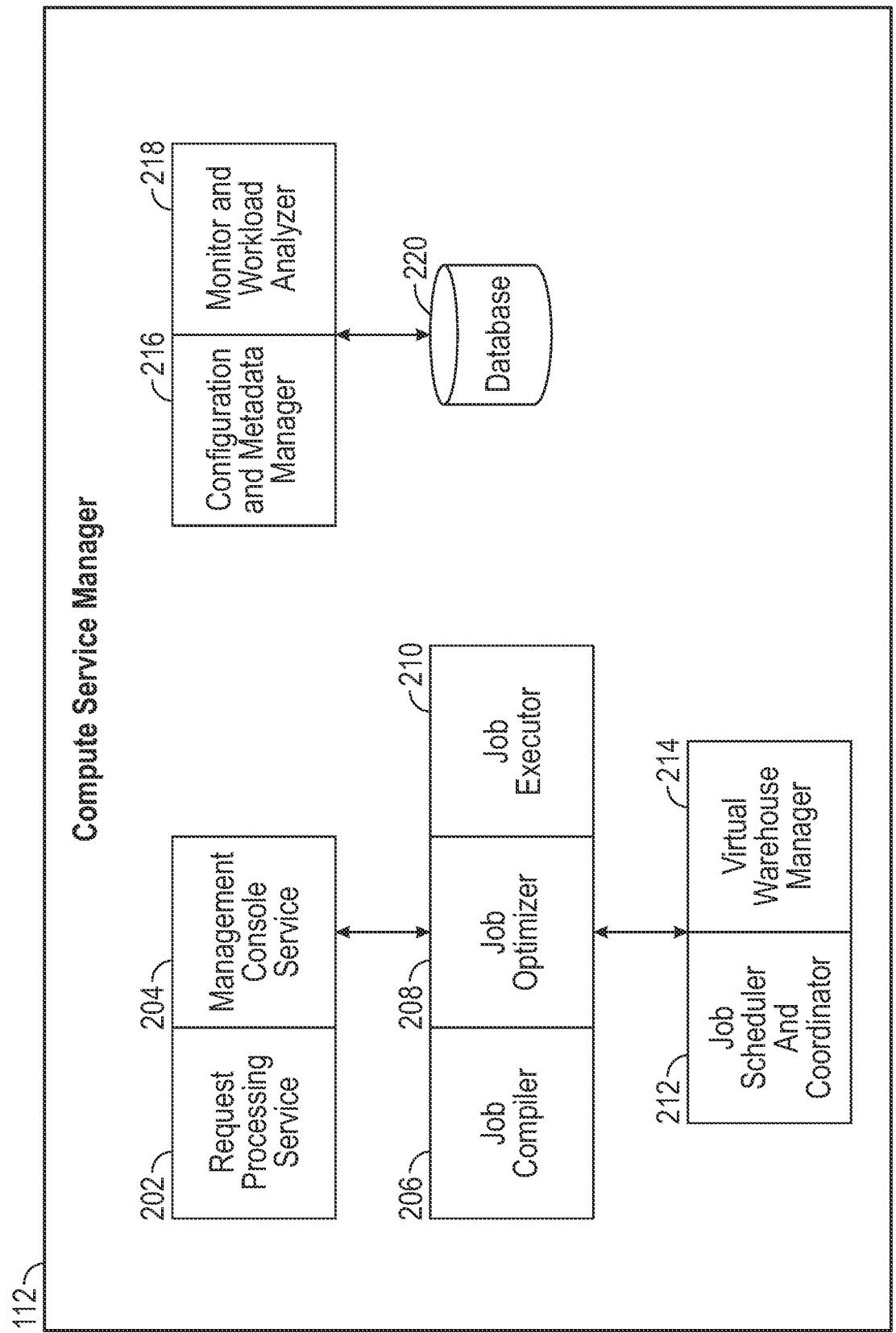
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
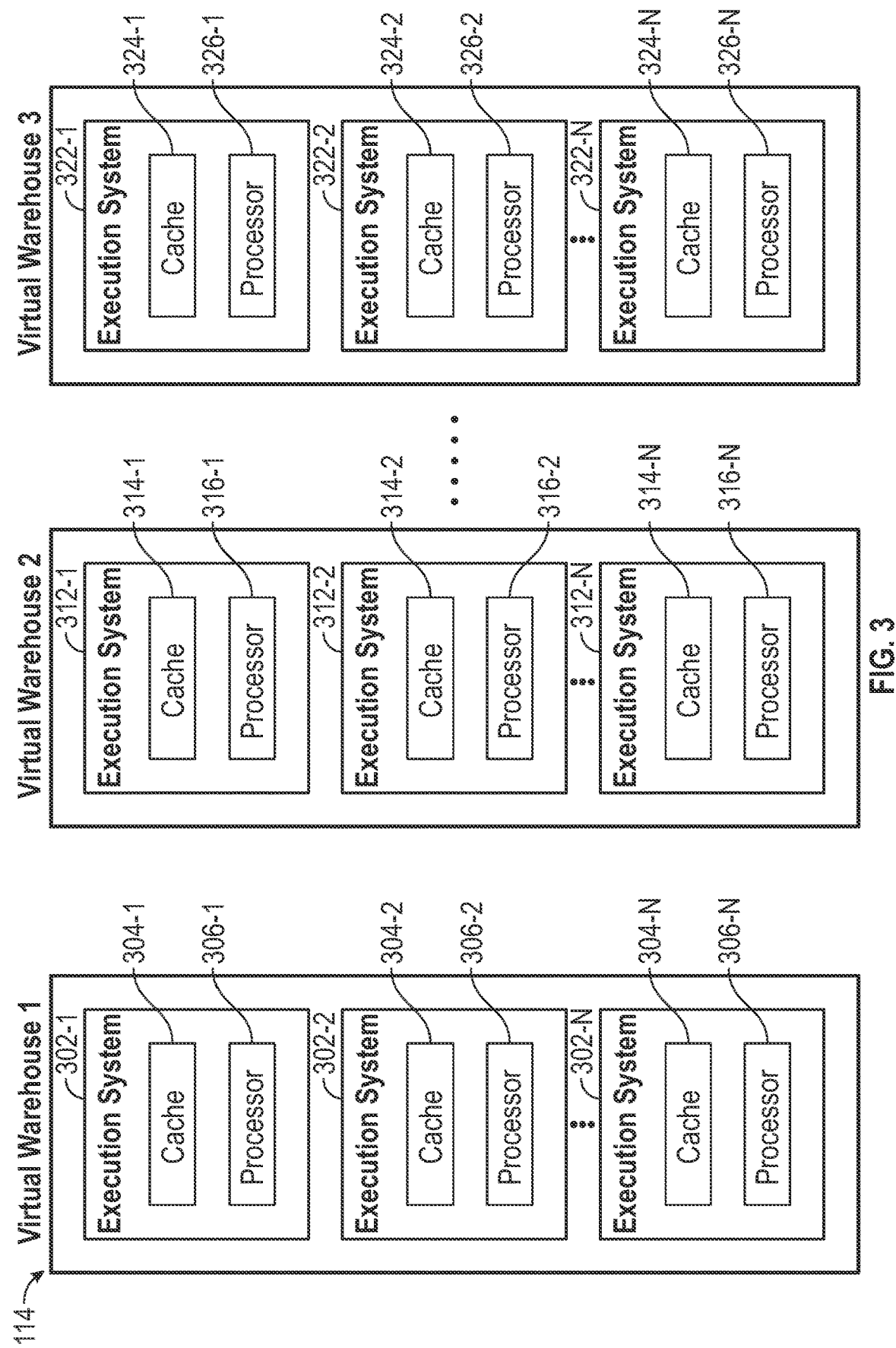
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As mentioned above, data from a client storage can be uploaded to the data warehouse. Some techniques can use a "copy" command for this transfer. The "copy" command is typically manually performed or performed based on a set schedule (say, every 15 minutes). However, the use of such "copy" commands can add latency.

Figure 4:
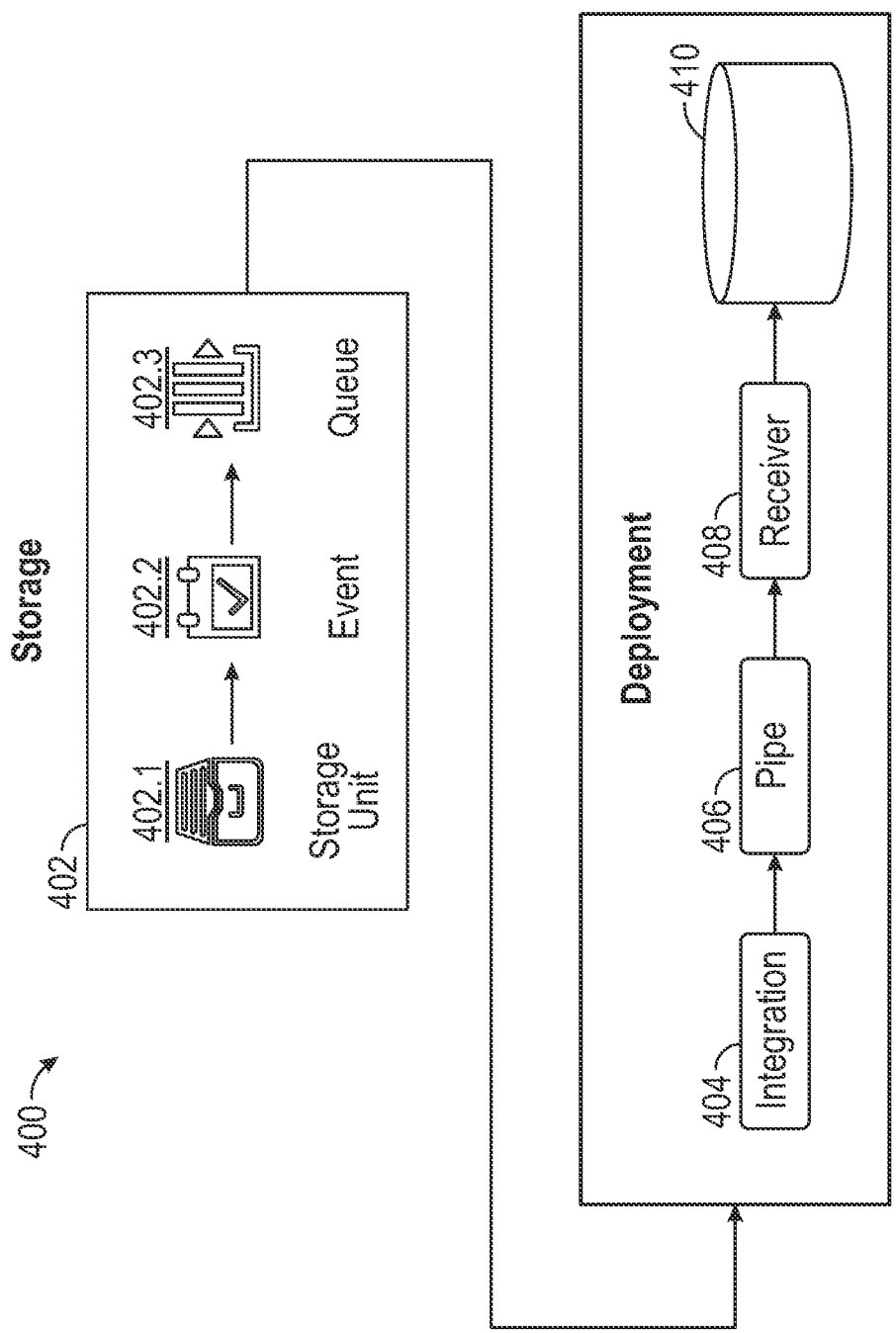
FIG. 4 is a simplified block diagram of a system for automated data ingestion, according to some example embodiments.

Latency can be improved by implementing auto-ingestion techniques, as described in further detail below. FIG. 4 is a simplified block diagram of system 400 for automated data ingestion, according to some example embodiments. The system may include a storage 402, which may be provided as cloud storage (e.g., Amazon S3 storage, Azure storage, GCP storage, etc.). The storage 402 may include client data to upload to the data warehouse.

The storage 402 may store files (or data) to be ingested into a database 410. In some embodiments, the storage 402 may include a storage unit 402.1, an event block 402.2, and a queue 402.3. The system may also include a deployment to ingest data in the database 410. A deployment may include multiple components such as a metadata store/DB, a front-end layer, a load balancing layer, a data warehouse, etc., as discussed above with respect to FIGS. 1-3. The deployments may be provided as public or private deployments. A public deployment may be implemented as a multi-tenant environment, where each tenant or account shares processing and/or storage resources. For example, in a public deployment, multiple accounts may share a metadata store, a front-end layer, a load balancing layer, a data warehouse, etc. A private deployment, on the other hand, may be implemented as a dedicated, isolated environment, where processing and/or storage resources may be dedicated.

The deployment may be communicatively coupled to the queue 402.3, and may include an integration 404, a pipe 406, and a receiver 408. Integration 404 may be configured to receive a notification when new data becomes available in queue 402.3. For example, the queue may include a pool of Simple Queue Service™ (SQS) queues as part of an Amazon Web Services™ S3 bucket. The pool of SQS queues may be provided to client accounts to add user files to a bucket. A notification may be automatically generated when one or more user files are added to a client account data bucket. A plurality of customer data buckets may be provided for each client account. The automatically generated notification may be received by the integration 404.

For example, the integration 404 may provide information relating to an occurrence of an event in the queue 402.3. Events may include creation of new data, update of old data, and deletion of old data. The integration 404 may also provide identification information for a resource associated with the event, e.g., the user file that has been created, updated, or deleted. The integration 404 may communicate with the queue 402.3 because the integration 404 may be provided with credentials for the queue 402.3, for example by an administrator and/or user. In an embodiment, the integration 404 may poll the queue 402.3 for notifications.

The integration 404 may deliver the notification to the pipe 406, which may be provided as a single pipe or multiple pipes. The pipe 406 may store information relating to what data and the location of the data for automatic data ingestion related to the queue 402.3.

The receiver 408 may perform the automated data ingestion, and then store the ingested data in the database 410. Data ingestion may be performed using the techniques described in U.S. patent application Ser. No. 16/201,854, entitled "Batch Data Ingestion in Database Systems," filed on Nov. 27, 2018, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

Figure 5:
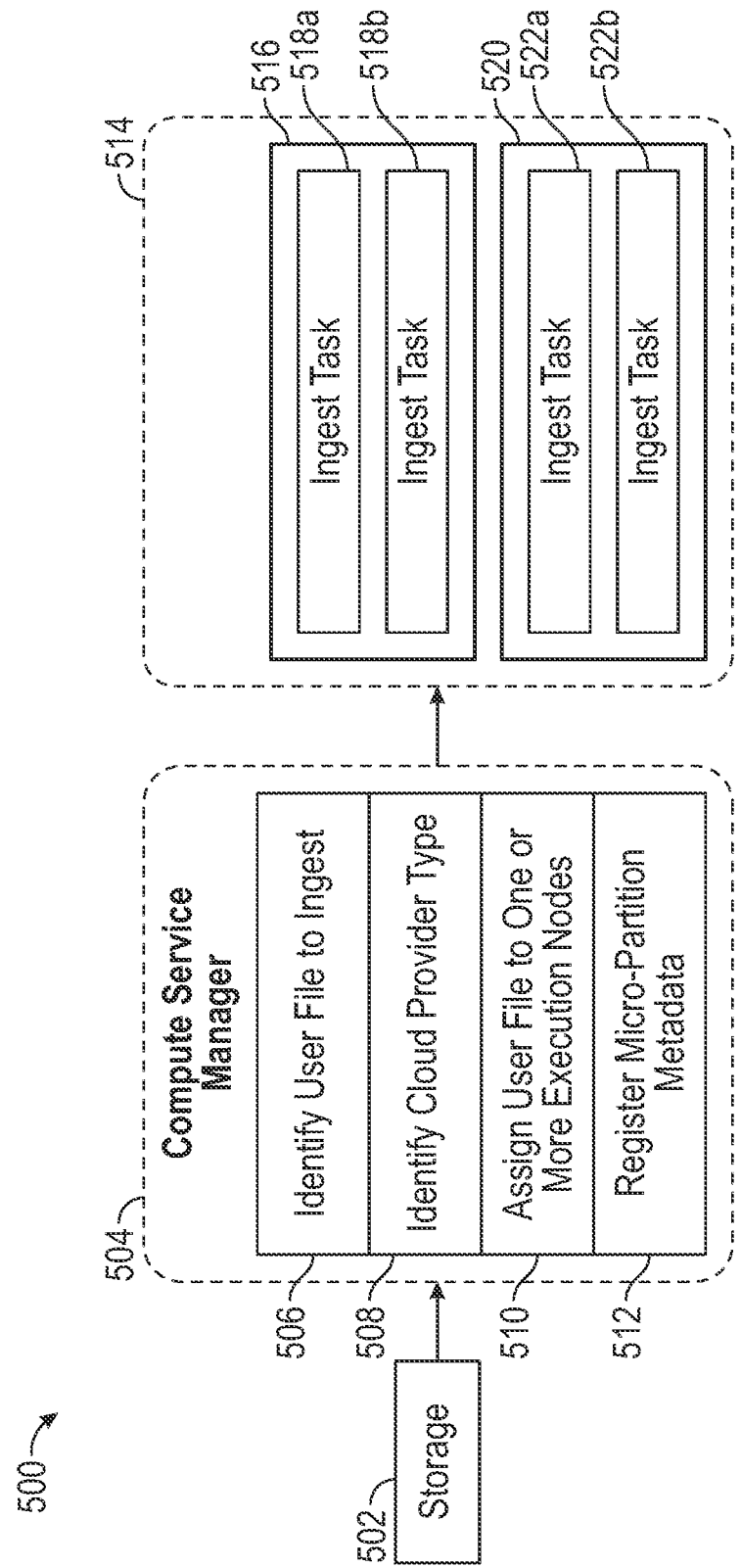
FIG. 5 is a schematic block diagram of a process of ingesting data into a database, according to some example embodiments.

FIG. 5 is a schematic block diagram of a process 500 of ingesting data into a database, according to some example embodiments. The process 500 begins and a storage 502 sends an ingest request, such as a notification. The storage 502 may directly or indirectly communicate with the database system to send in the ingest request. In some embodiments, the ingest request is a notification provided by a third-party vendor storage account, or the ingest request may arise from a compute service manager polling a data lake associated with the client account to determine whether any user files have been added to the client account that have not yet been ingested into the database. The notification includes a list of files to insert into a table of the database. The files are persisted in a queue specific to the receiving table of the database.

The ingest request is received by a compute service manager 504. The compute service manager 504 identifies at step 506 a user file to ingest. At step 508, the compute service manager identifies a cloud provider type associated with the client account. At step 510, the compute service manager 504 may assign the user file to one or more execution nodes, based at least in part on the detected cloud provider type, and registers at step 512 micro-partition metadata associated with a database table after the file is ingested into a micro-partition of the database table. The compute service manager 504 provisions one or more execution nodes 516, 520 of an execution platform 514 to perform one or more tasks associated with ingesting the user file. Such ingest tasks 518a, 518b, 522a, 522b include, for example, cutting a file into one or more sections, generating a new micro-partition based on the user file, and/or inserting the new micro-partition in a table of the database.

The process 500 begins an ingest task that is executed by a warehouse. The ingest task may pull user files from the queue for a database table until it is told to stop doing so. The ingest task may periodically cut a new user file and add it to the database table. In one embodiment, the ingest process is "serverless" in that it is an integrated service provided by the database or compute service manager 504. That is, a user associated with the client account need not provision its own warehouse or a third-party warehouse in order to perform the ingestion process. For example, the database or database provided (e.g., via instances of the compute service manager 504) may maintain the ingest warehouse that then services one or more or all accounts/customers of the database provider.

In some embodiments, there may be more than one ingest task pulling from a queue for a given table, and this might be necessary to keep up with the rate of incoming data. In some embodiments, the ingest task may decide the time to cut a new file to increase the chances of getting an ideal sized file and avoid "odd sized" files that would result if the file size was lined up with one or more user files. This may come at the cost of added complexity as the track line number of the files consumed must be tracked.

Errors during auto ingestion and other operations, such as copy commands, streaming ingests, materialized views, external tables, can occur. For example, one or more input rows can fail to load due to parsing or transform errors. In some conventional systems, a load history can have information about the file and an error message, but is left to the user to figure out which rows actually failed to load. This lack of information can become cumbersome for users when there are only a handful of bad rows in a file with several thousand valid rows.

In the streaming ingest example, the data system may want to ingest the valid or good rows and possibly ignore the bad rows causing the errors. In the materialized views example, dynamic materialized views can have input records that lead to errors during projection or in predicates, such as type casting errors or invalid arithmetic operations.

Next, techniques to track errors, such as failed rows, separately are described. With these techniques, the tracked errors, such as failed rows, can be easily accessible to the user so that automated or manual recovery actions can be appropriately taken to address the errors. Error tables, as described in further detail below, can be used to track errors. For example, error tables can be used for data quality checks and check constraint validations.

An error table may be attached to its corresponding base table as a nested object. An error table can be a child object of a parent base table. That is, each base table may have a corresponding error table. In some examples, an error table may be automatically created for a base table using the syntax for the base table for easy discovery by the user, as described in further detail below. Also, when a base table is replicated, the error table may be replicated, too. When a base table is deleted, the error table may be deleted, too. In some examples, users may be able to enable and disable error tables. For example, users may enable or disable an error table for a base table using an alter command. Enabling error tables at schema, database, or account level can enable error tables for all base tables in the hierarchy.

Figure 6:
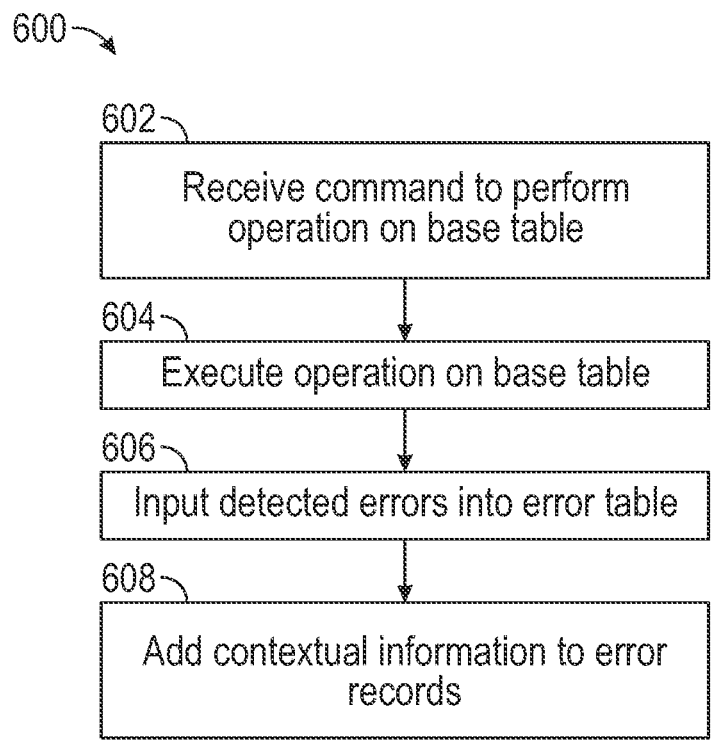
FIG. 6 is a flow diagram of a method for tracking errors using an error table, according to some example embodiments.

FIG. 6 is a flow diagram of a method 600 for tracking errors using an error table, according to some example embodiments. The method 600, for example, may be performed by one or more compute service managers and execution platforms, as described above.

At step 602, a command to perform an operation on a base table is received. The operation may include a variety of different data operations, such as auto-ingestion, copy command, streaming ingests, materialized views, external tables, etc. For example, the command may be to perform auto-ingestion of some files stored outside the data system into a base table stored in the data system using auto ingestion techniques described above with reference to FIGS. 4 and 5. That is, a compute service manager, as described herein (e.g., compute service manager 504), may receive notifications of files to be ingested and create a query plan for ingesting those files. The compute service manager may assign ingest tasks to execution nodes of one or more execution platforms (XPs) as described above.

At step 604, the operation may be executed on the base table. In an auto-ingestion example, the XPs may start executing the ingest tasks for an auto-ingestion command. At step 606, one or more errors from the execution of the operation may be detected and inputted into an error table associated with the base table. Consider an example: an auto-ingestion operation for ingesting 100 rows into the base table, but 5 rows encountered an error in the ingestion process. For each row that encountered an error and could not be ingested, a corresponding row entry is made in the error table (e.g., error record data).

At step 608, contextual information (also referred to as diagnostic information) is added to the error records. The contextual information can be used by the user to determine information about the source of the error and to determine recovery actions to resolve the error. The recovery actions may be manual or automatic. The contextual information can also be used to understand broader trends about the errors and identify the source of the errors.

The error table may be stored as attached to the base table using storing techniques described herein, for example with reference to FIGS. 1-3. The error table may be a nested table of the associated base table. In some examples, respective base tables may each have a corresponding error table attached. Hence, the error table may be managed by the data system, and users do not have to handle setting up and managing the error tables. Moreover, because the error tables are managed by the data system, role-based access control (RBAC) techniques can be employed to provide underlying permissions to the error table so that unauthorized users cannot access the error table and information about the bad rows associated with the base table. The error table can provide a transactional and consistent view of errors. The error table can record errors from different operations performed on a base table, so that it provides an accessible location to deal with error records generated from different operations and features (e.g., copy, auto-ingestion, materialized tables, streaming ingest, external tables).

The data system can manage the schema of the error tables. In addition to the error record, contextual information can be added by the data system (e.g., compute service manager) to provide additional information regarding the context and source of the error.

The schema of the error table can include a timestamp value associated with an error record, which provides an event timestamp. The schema of the error table can include a source value (e.g., source column), which may include a string value describing the operation which led to the error record (e.g., e.g., copy, auto-ingestion, materialized tables, streaming ingest, external tables). The schema of the error table can include source identification (source_id), which may include a number ID for the identifier of the source if applicable (null if not applicable). For example, for auto-ingestion, the source_id may correspond to the pipe identification used for ingestion (pipe_id).

The schema of the error table can include a query identification value (query_id), which may be a string value for operations corresponding to queries. For operations not corresponding to queries, such as auto-ingestion, a null value may be set for the query_id. The schema of the error table can include a session identification value (session_id), which may include a number value for the session in which the operation was executed if appropriate. Other identification information may be included, such as warehouse name, warehouse_id, database name, database_id, schema name, schema_id, table name, table_id (relative id of object (table or materialized table), user name, user_id (relative id of user executing operation), and user_role (role used for executing the operation). For example, the user_id for a materialized table may be the owner of the materialized table, for auto-ingestion may be null, for a copy command may be the user executing the command, and for streaming ingest may be the user performing INSERT.

The schema for the error table can include a message, which may be a string value displaying an error message for the user. The schema for the error table can include error record data, which may be a variant value and may include the failed record (e.g., includes relevant column data). The failed record may be a base-64 encoded value if the record is unable to be parsed. In some example, the failed record may be truncated if beyond a specified length.

The schema for the error table can include column information. The column information may include an error column, which may be a string value for the name of the column that had the failed input (bad input). The column information may include error column value, which may be a variant value of the offending column that resulted in the failure. The schema for the error table can include a record metadata field, which may be a variant value and include additional source-specific metadata for the record. For example, for auto-ingestion and copy command, it can include a file path and row number; for materialized table, it can include metadata row identification, metadata action, and index of projection in the plan for the materialized table; for streaming ingest, it can include channel identification.

As mentioned above, the error table may be attached to the base table. Hence, discovery of the error table can be straightforward since the error table maps 1:1 with the base table. RBAC rules from the base table can be easily applied to the corresponding error table for allowing or restricting select operations. The error table can include respective errors from different operations for the base table, providing a single location for the user to view errors for a base table. This attachment to the base table allows more efficient determination and performance of recovery actions because the error data is local to the base table.

Figure 7:
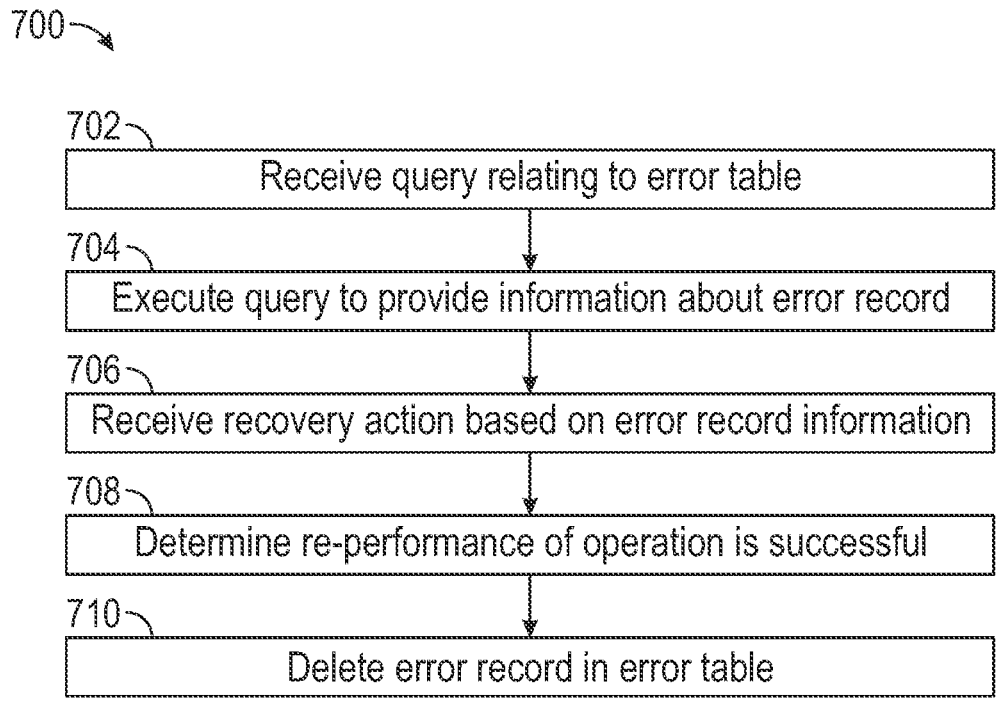
FIG. 7 is a flow diagram of a method for querying an error table and performing recovery actions, according to some example embodiments.

FIG. 7 is a flow diagram of a method 700 for querying an error table and performing recovery actions, according to some example embodiments. The method 700, for example, may be performed by one or more compute service managers and execution platforms, as described above.

At step 702, the system may receive one or more queries from a user relating to an error table attached to a base table. For example, the query may include a select, delete, truncate, and/or copy unload operation. In some examples, an error table is automatically created for every base table stored in the data system and can be accessible using a special syntax, such as "Table$errors" where "Table" represents the base table name. For example, for a table named "Products," the error table can be queried using the operation: SELECT * FROM Products$errors.

At step 704, the system may execute the one or more queries from the user, providing context information relating to the error records cataloged in the error table. Consider a stock transaction example: an account performed an auto-ingestion operation for a file stored in an external cloud storage location to be ingested into a base table "stocks" in the data system. The file included 100 rows relating to stock transactions, but 5 rows could not be ingested because of some error. One column in the file is a binary representation of respective stock transactions. A transform on that column including the binary representation is performed to extract information from the column (e.g., who made the trade, amount, timestamp, etc.). A user-defined function (UDF) can be invoked to extract the information. For 5 rows, the UDF failed causing the errors in the 5 rows.

In this example, the user may first query the error table for the "stocks" base table to determine how many rows could not be ingested: select count (*) from stocks$errors. The system would execute the select operation and return a value of 5 rows in this example. Next, the user can query the error table to determine the source of the errors for those 5 tables. For example, the user can view the error message for those 5 rows: select message from stocks$errors. The system can return the error messages, which, for example, can be "UDF crashed; unable to parse data." The user can then query the error tables for the metadata for the 5 rows to determine the reason for the error: select record_metadata from "stocks$errors. Here, the system may return metadata where in the UDF is failing. For example, the metadata may reveal that the binary representation of the 5 rows may have some encoding issue that is incompatible with the UDF.

At step 706, the system may receive one or more recovery actions based on the information from the error table. The recovery actions may be manual (e.g., through code, graphical user interface, etc.) or automatic actions. For example, in the stock transaction example, the user may modify the UDF to account for the encoding issue in the 5 rows that encountered an error during ingestion. The system may then re-execute the operation that led to the error for the effected rows.

At step 708, the system may check if the re-execution of the operation on the affected rows was successful (e.g., no new error records inputted into the error table). At step 710, the system may receive and execute a delete command from the user to delete the error records of the affected rows. In the stocks transaction example, the system may receive: delete from stocks$errors where error_message= "UDF crashed; unable to parse data." In some examples, deletions of corrected error records may be automatic.

For a materialized view/table, the error table is attached to the materialized table, not the upstream table from which the materialized table is created. A materialized view may be a declarative specification of a persistent query result that is automatically maintained and transparently utilized. In some examples, a materialized view may include a local copy of data located remotely or may include a subset of rows and/or columns (may be referred to as a "partition" or "micro-partition") of a base table or join result or may alternatively include a summary using an aggregate function. Materialized views may be generated by way of materialization, where the results of a query are cached similar to memorization of the value of a function in functional languages. Materialized views improve performance of expensive queries by materializing and reusing common intermediate query results in a workload. Materialized views are utilized to improve performance of queries at the expense of maintenance cost and increased storage requirements.

Consider an example of a materialized view being created for an upstream table. An error table may be attached to the materialized view/table. The upstream table may be updated (e.g., alter table upstream_table drop column id). This update to the upstream table may cause an error for the materialized view, because the materialized view may be unable to be refreshed. Thus, the user can query the error table to determine that the materialized view could not be refreshed because the upstream source has a column now missing because of the update to the upstream table. This information can be in the error message and error column fields of the error table. Given this information, the user can either repair the upstream table or modify the materialized view in light of the update to the upstream table. After the recovery action is performed, the error record from the error table can be deleted by the user.

The use-case scenario of external tables can involve the creation of an object inside the data system to represent the external table for the attachment of the error table. For example, a user of the data system may set up an external table outside of the data system, but may want to query the data in the external table from the data system. The user may set a location in cloud storage to persist files, such as a S3 bucket. For the user to query the data from the data system, the data system may create an external table object ("et") in the data system representing the external table. Now consider an error occurring when the external table is queried. For example, data in the external table is improperly compressed. An error table can be attached to the external table object ("et") in the data system recording error data. The user can query the error table to determine the source and context of the error and perform appropriate recovery actions, such as overwriting the improperly compressed files or removing the files from the cloud storage. The user can then try to perform the operation on the external table again and determine if the operation can be performed without new errors. If no new errors occurred, the respective rows in the error table can be deleted.

The error tables, described herein, are populated in a transactional manner so that errors are consistently logged. For respective errors encountered, an error record is transactionally written into the corresponding error table. This reduces (or eliminates) missing error records for encountered errors.

Figure 8:
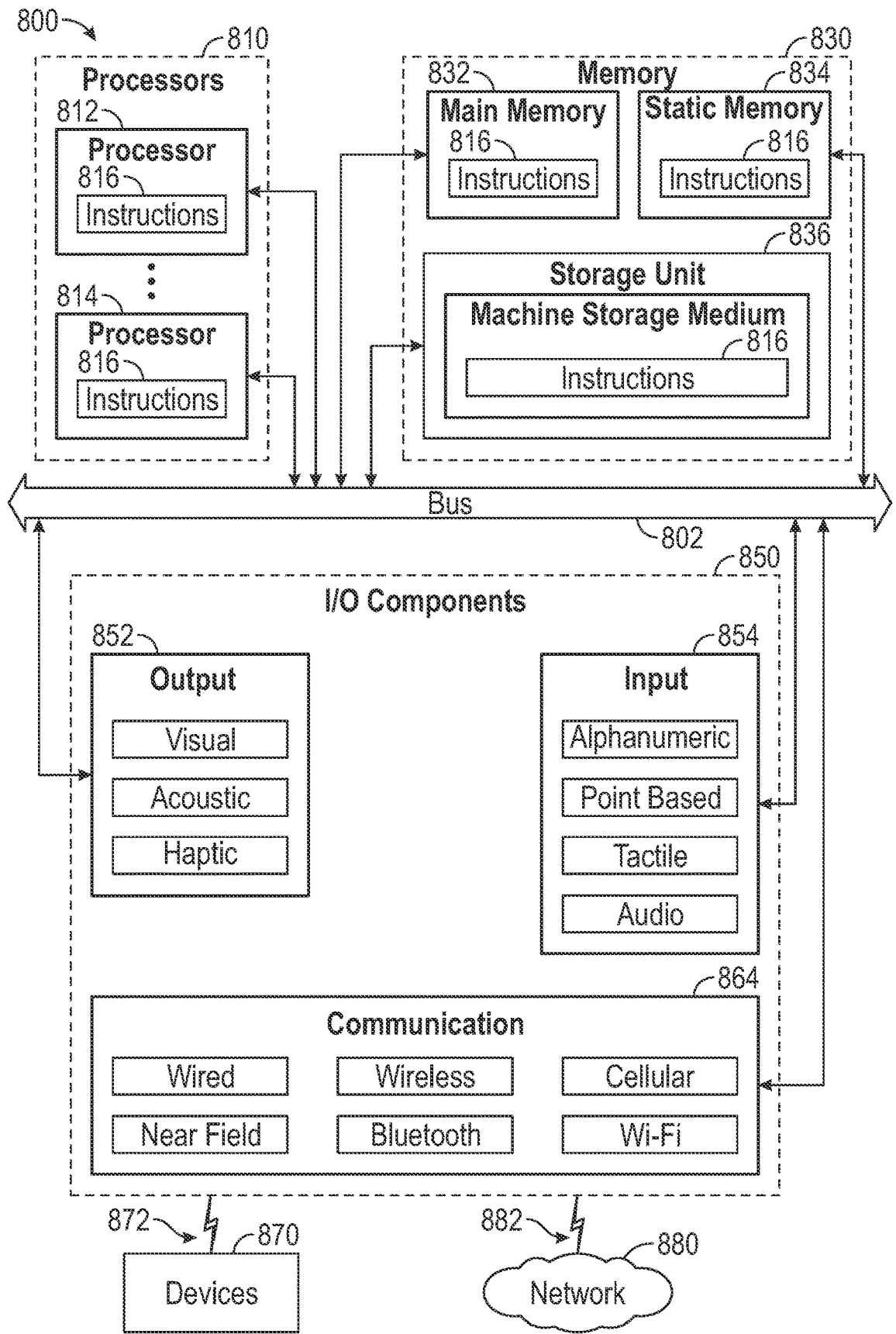
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., the remote computing device 106, the access management system 110, the compute service manager 112, the execution platform (XP) 114, the access management system 118, the Web proxy 120) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 118, the compute service manager 112, the execution platform 114, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving, by at least one hardware processor, a command to perform an operation on a base table stored in a network-based data system; executing the operation on the base stable, the execution of the operation causing at least one error; inputting at least one error record corresponding to the at least one error into an error table, the error table being nested with the base table; and adding contextual information to the at least one error record.

Example 2. The method of example 1, further comprising: receiving a query directed to the error table; and executing the query to provide information about the at least one error record.

Example 3. The method of any of examples 1-2, further comprising: performing a recovery action based on the information about the at least one error record; and re-executing the operation on at least one row in the base table corresponding to the at least one error record.

Example 4. The method of any of examples 1-3, further comprising: determining that the re-executing the operation is successful; and deleting the at least one error record from the error table.

Example 5. The method of any of examples 1-4, wherein the operation includes auto-ingestion of data in a file from an external location into the base table.

Example 6. The method of any of examples 1-5, wherein the operation includes performing an action on an external table stored outside of the data system.

Example 7. The method of any of examples 1-6, wherein the base table is an object stored in the data system representing the external table.

Example 8. The method of any of examples 1-7, wherein the base table includes a materialized view.

Example 9. A system comprising: one or more processors of a machine; and a memory storing instructions that, when executed by the one or more processors, cause the machine to perform operations implementing any one of example methods 1 to 8.

Example 10. A machine-readable storage device embodying instructions that, when executed by a machine, cause the machine to perform operations implementing any one of example methods 1 to 8.

What is claimed is:

1. A method comprising:
   providing an error table nested with a base table in a network-based data system, the base table being provided as a parent object and the error table is provided as a child object to the base table in the network-based data system;
   in response to an operation being executed on the base table, detecting at least one error being caused the operation; and
   inputting at least one error record corresponding to the at least one error into the error table.

2. The method of claim 1, further comprising:
   receiving a query directed to the error table; and
   executing the query to provide information about the at least one error record.

3. The method of claim 2, further comprising:
   performing a recovery action based on the information about the at least one error record; and
   re-executing the operation on at least one row in the base table corresponding to the at least one error record.

4. The method of claim 3, further comprising:
   determining that the re-executing the operation is successful; and
   deleting the at least one error record from the error table.

5. The method of claim 1, wherein the operation includes auto-ingestion of data in a file from an external location into the base table.

6. The method of claim 1, wherein the operation includes performing an action on an external table stored outside of the data system.

7. The method of claim 6, wherein the base table is an object stored in the data system representing the external table.

8. The method of claim 1, wherein the base table includes a materialized view.

9. A non-transitory machine-storage medium embodying instructions that, when executed by a machine, cause the machine to perform operations comprising: providing an error table nested with a base table in a network-based data system, the base table being provided as a parent object and the error table is provided as a child object to the base table in the network-based data system; in response to an operation being executed on the base table, detecting at least one error being caused the operation; and inputting at least one error record corresponding to the at least one error into the error table.

10. The non-transitory machine-storage medium of claim 9, further comprising: receiving a query directed to the error table; and executing the query to provide information about the at least one error record.

11. The non-transitory machine-storage medium of claim 10, further comprising: performing a recovery action based on the information about the at least one error record; and re-executing the operation on at least one row in the base table corresponding to the at least one error record.

12. The non-transitory machine-storage medium of claim 11, further comprising: determining that the re-executing the operation is successful; and deleting the at least one error record from the error table.

13. The non-transitory machine-storage medium of claim 9, wherein the operation includes auto-ingestion of data in a file from an external location into the base table.

14. The non-transitory machine-storage medium of claim 9, wherein the operation includes performing an action on an external table stored outside of the data system.

15. The non-transitory machine-storage medium of claim 14, wherein the base table is an object stored in the data system representing the external table.

16. The non-transitory machine-storage medium of claim 9, wherein the base table includes a materialized view.

17. A system comprising:
    at least one hardware processor; and
    at least one memory storing instructions that, when executed by the at least one hardware processor, cause the at least one hardware processor to perform operations comprising:
    providing an error table nested with a base table in a network-based data system, the base table being provided as a parent object and the error table is provided as a child object to the base table in the network-based data system;
    in response to an operation being executed on the base table, detecting at least one error being caused the operation; and
    inputting at least one error record corresponding to the at least one error into the error table.

18. The system of claim 17, further comprising:
    receiving a query directed to the error table; and
    executing the query to provide information about the at least one error record.

19. The system of claim 18, further comprising:
    performing a recovery action based on the information about the at least one error record; and
    re-executing the operation on at least one row in the base table corresponding to the at least one error record.

20. The system of claim 19, further comprising:
    determining that the re-executing the operation is successful; and
    deleting the at least one error record from the error table.

21. The system of claim 17, wherein the operation includes auto-ingestion of data in a file from an external location into the base table.

22. The system of claim 17, wherein the operation includes performing an action on an external table stored outside of the data system.

23. The system of claim 22, wherein the base table is an object stored in the data system representing the external table.

24. The system of claim 17, wherein the base table includes a materialized view.

* * * * *